Inventor
Frank E. Waring

# United States Patent Office 2,747,063
Patented May 22, 1956

2,747,063
PORTABLE ELECTRIC SPOT WELDING TOOLS

Frank Edgar Waring, Macclesfield, England, assignor to Triangle Products Limited, Hulme, Manchester, England, a British company Application November 25, 1953, Serial No. 394,447

5 Claims. (Cl. 219—4)

This invention relates to portable electric spot welding tools of the kind comprising a body part in which is located an electric stepdown transformer, the low voltage secondary winding of which is connected to a pair of welding tongs having electrode contact tips and adapted to be brought together by an articulated lever and link system operable by a lever forming part of or adjacent to a hand grip for manipulation of the tool (hereinafter called a spot welding tool of the type described). Said lever has also been arranged to actuate a switch in the primary circuit, but such switch is not essential.

One of the disadvantages of portable electric spot welding tools of the kind aforesaid is that it is tiring to the operator mainly because of its weight. The present invention is based upon an appreciation that the present position of the main pressure operating handle on top of the transformer and by which it is also intended that much of the weight of the tool shall be supported, is misplaced and is largely responsible for the element of fatigue to the user. Additional handles shaped for example like a pistol grip behind the transformer are intended for and are primarily, if not solely, for an on-off switch for the primary circuit, and in use the hand must be taken from the pressure operating handle in order to operate the trigger.

The main object of the present invention is to provide a portable spot welding tool of the kind aforesaid having an improved construction and arrangement of parts.

According to the present invention a portable spot welding tool of the type described is characterised by a pillar-type hand-grip with an adjacent control lever located substantially below the centre of gravity of the tool, whereby the weight of the tool may be supported, the tool positioned and the lever for the tong actuated by one hand whilst still gripping the pillar, while the rear end rests on the hip, the forearm of the other arm supports the tool by pressing it against the operator's side, and the right hand of the same arm supports the body of the tool from underneath in an approximate centre position, so that there are four definite points of weight suspension giving good balance and ease of manipulation with the minimum of physical effort.

The invention will be described further, by way of example with reference to the accompanying drawings, in which.

Figure 1:
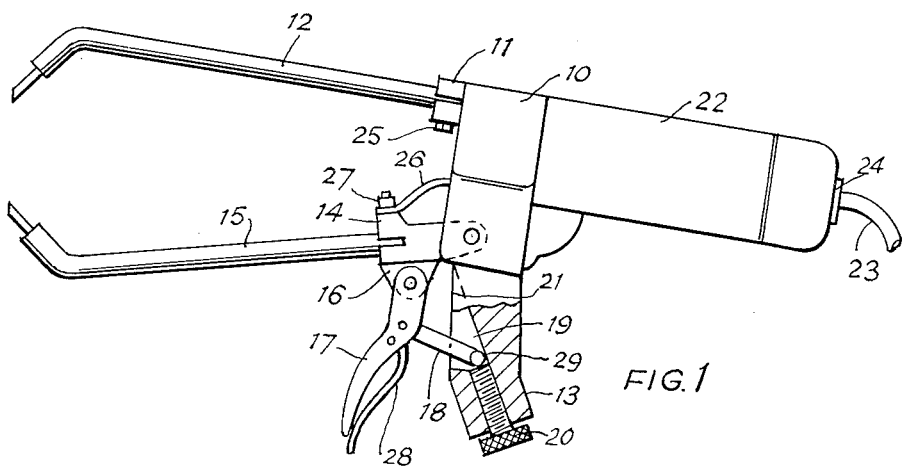
Fig. 1 is a side elevation of a preferred arrangement showing the tongs open.
Figure 2:
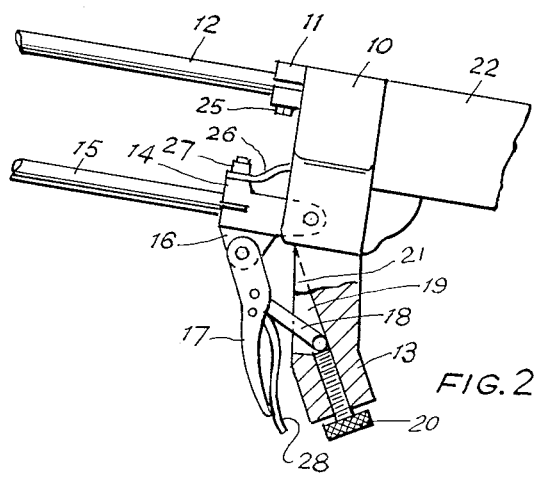
Fig. 2 is a fragmentary view corresponding with Fig. 1 but showing the tongs closed.

In the example of the invention illustrated, the improved portable welding tool comprises a body part 10 in the form of a light alloy casting at the upper forward face of which is a socket clamp 11 for holding a stationary upper electrode 12. The lower portion of the body part is formed as a pillar 13 of oval section extending downwardly with a slight rearward inclination and about 8 inches in length; pivoted to the front of the body part 10 and below the clamp 11 for the upper fixed electrode is a clamp 14 for a movable electrode 15 of the spot welding tongs. On the underside of such movable clamp is a lug 16 to which is connected one end of a lever 17 to which is in turn connected a link 18 forming an articulated lever system. The pillar 13 forms the handle of the tool, and has a longitudinal hole 19, in the lower end of which is fitted an adjustable abutment screw 20, a slot 21 being provided in the upper front face of said pillar 13 in which the end of the link 18 is located to rest on the inner end of the abutment screw 20. A rivet 29 at the lower end of the link 18 serves to prevent the link disengaging from the slot 21, whilst a toggle release arm 28 in the form of a single leaf spring serves to release the lever system from its locked position when the operator releases pressure from the lever 17.

A transformer is attached to the rear face of the body part 10 and is of the usual elongated shape, and, for appearance and general protection, is preferably enclosed with a suitable tubular casing 22. An electric supply lead 23 enters such casing through a suitable insulating eye or ring 24 and connects with the transformer.

A heavy gauge copper lead comprising a series of laminations, from the secondary of the transformer is directly connected to the fixed clamp 11 by means of a lug 25 on the body part 10. The other lead of the secondary is connected by a heavy flexible conductor strip 26 to a lug 27 on the top of the movable electrode clamp 14.

In the body part of the tool there is also an indicator lamp (not shown) of low voltage, arranged in series with the primary winding and of such wattage as to be lighted when a normal welding current is flowing in the secondary, the amperage of the welding current determining also the amperage of the primary current. The indicator lamp therefore indicates whether or not an effective welding current is flowing and would avoid faulty weld spots which might be caused by oxides or other causes of bad contact.

In use, the operator holds the pillar 13 and supports the tool with one hand. With the same hand he is able to manipulate the lever 17 for actuating the tong-like electrodes 12, 15. The articulated lever system approaches toggle-like action when actuated to close the electrodes and high contact pressure is thereby obtainable. The adjusting screw 20 enables adjustment to be made for work of different thicknesses. Positional control of the tool is obtained by holding the casing 22 of the transformer against the body, using the forearm or upper arm for that purpose.

I claim:

1. A portable electric spot welding tool comprising a body part, an electric stepdown transformer in longitudinal alinement with said body part, a pillar type handgrip secured below and approximately at right angles to said body part and substantially at the center of gravity of said tool, a fixed longitudinal tong mounted on said body part and a movable tong hingedly mounted below said fixed tong, the two tongs being respectively connected to the low voltage secondary winding of said transformer and on the opposite side of said body part, electrode contact tips mounted on the ends of said tongs in such manner that when the said movable tong is moved towards said fixed tong the two contact tips will abut one another, a control lever pivoted on said movable tong to move said tong and by a linkage to said pillar type handgrip towards and away from said fixed tong, said control lever being adjacent to said pillar type handgrip, said tool being adapted to be supported by one hand and said control lever being operable by that hand, the rear end of the tool being capable of being held between the body and the upper part of the arm of the operator for positional control and partial support.

2. A portable electric spot welding tool comprising a body part, an electric stepdown transformer in longitudinal alinement with said body part, a pillar type handgrip secured below and approximately at right angles to said body part and substantially at the center of gravity of said tool, a fixed longitudinal tong mounted on said body part and a movable tong hingedly mounted on said body part below said fixed tong, the two tongs being respectively connected to the low voltage secondary winding of said transformer and on the opposite side of said body part, electrode contact tips mounted on the ends of said tongs in such manner that when the movable tong is moved towards said fixed tong, the two contact tips will abut one another, a control lever pivoted to said movable tong, a slot in said handgrip, a link pivoted at one end to said control lever and having its other end displaceably secured in said slot, said control lever and said link collectively forming a toggle-like articulated arrangement so that, upon manual movement of said control lever towards said handgrip said movable tong is displaced towards said fixed tong, said tool being adapted to be supported by one hand and said control lever being operable by that hand, the rear end of the tool being capable of being held between the body and the upper part of the arm of the operator for positional control and partial support.

3. A portable electric spot welding tool comprising a body part, an electric stepdown transformer in longitudinal alinement with said body part, a pillar type handgrip secured below and approximately at right angles to said body part and substantially at the center of gravity of the tool, an axial bore in said handgrip accommodating an adjusting screw, a fixed longitudinal tong mounted on said body part and a movable tong hingedly mounted on said body part below said fixed tong, the two tongs being respectively connected to the low voltage secondary winding of said transformer and on the opposite side of said body part, electrode contact tips mounted on the ends of said tongs in such manner that when the movable tong is moved towards the fixed tong the two contact tips will abut one another, a control lever pivoted to said movable tong, a slot in said handgrip, a link pivoted at one end to said control lever and having its other end displaceably secured in said slot and adapted to abut the end of the adjusting screw in said handgrip, said control lever and said link collectively forming a toggle-like articulated arrangement so that, upon manual movement of said control lever towards said handgrip said movable tong is displaced towards said fixed tong, said tool being adapted to be supported by one hand and said control lever being operable by that hand, the rear end of the tool being capable of being held between the body and the upper part of the arm of the operator for positional control and partial support.

4. A portable electric spot welding tool comprising a body part, an electric stepdown transformer in longitudinal alinement with said body part, a pillar type handgrip secured below and approximately at right angles to said body part and substantially at the center of gravity of the tool, a fixed longitudinal tong mounted on said body part and a movable tong hingedly mounted on said body part below said fixed tong, the two tongs being respectively connected to the low voltage secondary winding of said transformer and on the opposite side of said body part, electrode contact tips mounted on the ends of said tongs in such manner that when the movable tong is moved towards the fixed tong the two contact tips will abut one another, a control lever pivoted to said movable tong, a slot in said handgrip, a link pivoted at one end to said control lever and having its other end displaceably secured in said slot and adapted to abut the end of a screw adjustably located axially in said handgrip, said control lever and said link collectively forming a toggle-like articulated arrangement, so that, upon manual movement of said control lever towards said handgrip said movable tong is displaced towards said fixed tong, toggle release means pivotally attached to said control lever below said link and adapted to abut said handgrip whereupon manual actuation of said toggle release means causes said control lever to be displaced away from said handgrip, said tool being adapted to be supported by one hand and said control lever and said toggle release means being operable by that hand, the rear end of the tool being capable of being held between the body and the upper part of the arm of the operator for positional control and partial support, if desired.

5. A portable electric spot welding tool as set forth in claim 4 in which said toggle release means comprises a single leaf flat metal spring pivoted to said control lever.

References Cited in the file of this patent

UNITED STATES PATENTS

| | | |
|---|---|---|
| 2,371,664 | Workman | Mar. 20, 1945 |
| 2,396,870 | McLean | Mar. 19, 1946 |
| 2,441,438 | Mulder | May 11, 1948 |
| 2,464,054 | Panik | Mar. 8, 1949 |

FOREIGN PATENTS

| | | |
|---|---|---|
| 213,774 | Switzerland | June 3, 1941 |